May 11, 1937.     M. OSNOS     2,079,921
VARIABLE CONDENSER
Filed Aug. 18, 1932
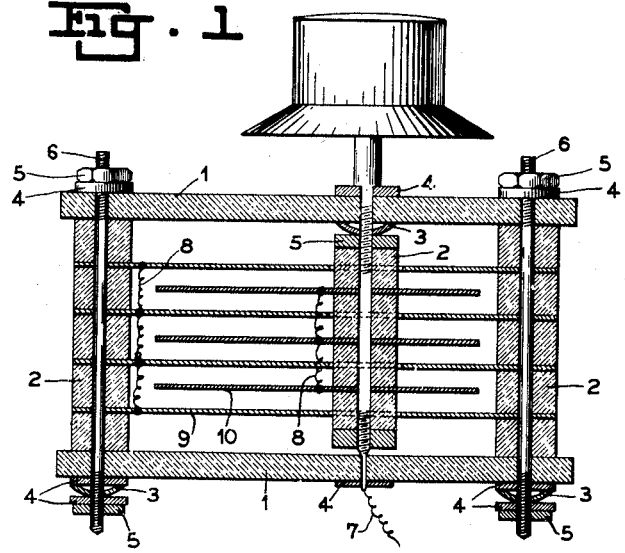
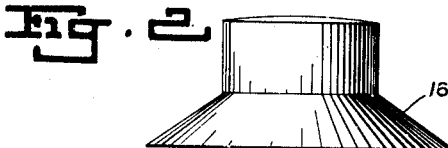
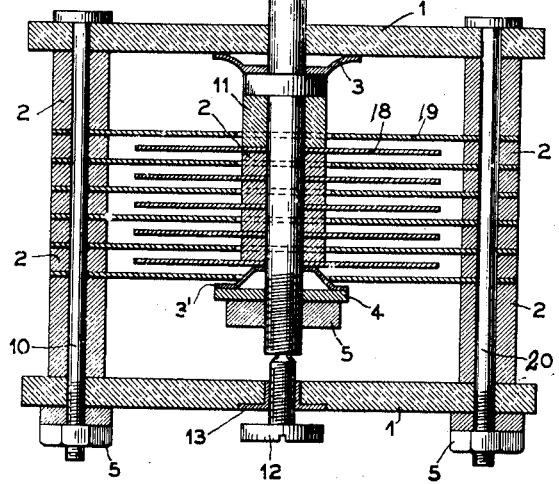
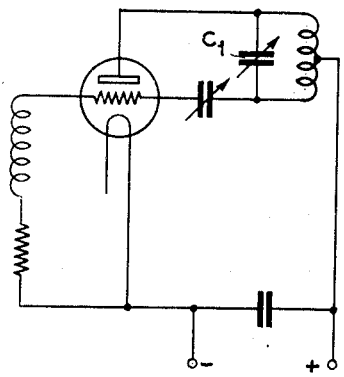
INVENTOR
MENDEL OSNOS
BY
ATTORNEY Patented May 11, 1937

2,079,921

UNITED STATES PATENT OFFICE 2,079,921

VARIABLE CONDENSER

Mendel Osnos, Berlin, Germany, assignor to Telefunken Gesellschaft für Drahtlose Telegraphie m. b. H., Berlin, Germany, a corporation of Germany Application August 18, 1932, Serial No. 629,333 In Germany December 17, 1931

5 Claims. (Cl. 175—41.5)

In the ordinary condensers as used today, the capacity in general varies according to the temperature.

In accordance with the present invention an influence of temperature can be obtained as may be desired, thus it is possible to increase, reduce or eliminate this influence by making the distance between the individual plates of same polarity, or the distance between plates of different polarity totally or partially dependent on the temperature of a spacer, the heat expansion coefficient of which is greater than that of metal (copper, brass or the like) which in general is used for surfaces of effective capacity. The increase in the spacing of the plates due to the heat to which the condenser is subjected generally reduces its capacity. An additional effect to be reckoned with results from the influence of the heat expansion of the condenser plate as well as that of the mounting plates consisting in general of insulating material whereby the capacity of the condenser either increases or decreases with the temperature in accordance with the construction of the condenser.

If, for instance, in a variable condenser the outer rims of the plates of the fixed plate system are fastened to mounting plates consisting of insulating material of relatively high thermal expansion coefficient, then heating of the mounting plates may cause a considerably large displacement of the fixed plates into the space outside of the capacitive space, whereby, in spite of the heat expansion of the condenser plates, the capacity may decrease with an increase in temperature. According to the invention this decrease of capacity may still be augmented by using a spacer of a material whose thermal expansion coefficient is greater than that of the metal of the condenser, as is the case when, for instance, hard rubber is used for the spacer. If, however, expansion of any of the condenser elements has an influence upon the change in capacity whereby, with the use of metallic spacers, the capacity would increase with an increase in temperature, this effect can be compensated by employing spacers of a material of a high heat expansion coefficient, or an over compensation, or total independence of the capacity from the temperature may be reached.

Furthermore, if the spacers of the two plate systems are made totally or partially of different materials, for instance, in one system of a material with a high heat expansion coefficient such as hard rubber and in the other system of a material with a lower heat expansion coefficient, it is possible to obtain an increase in capacity by the change in the plate distances due to heating. This is due to the fact that at increasing temperature, each plate disposed between two plates of different polarity will move farther away from its symmetrical position with respect to the two plates, whereby, although its distance from one plate increases, the distance from the other plate simultaneously decreases.

The arrangement may eventually also be such that the reverse action takes place i. e., that by increasing temperature one plate system will move towards the symmetrical position. Whether one or the other condition will result depends entirely upon the relative position of the plate system at the initial temperature. It is presupposed that the construction of the condenser for all of these combinations is such that it enables an expansion or contraction respectively of the respective spacers in accordance with the prevailing temperature. In other words, the construction must be such that these spacers are not disturbed in their expansion or contraction by other spacers.

In the drawing,

Fig. 1 illustrates a condenser embodying an approved form of the invention.

Fig. 2 illustrates a modification thereof, and

Fig. 3 is a diagram of a circuit in which the condenser of Figs. 1 and 2 may be used.

Figure 1 shows an embodiment in accordance with the present invention. The mounting plates composed of insulating material are shown as at 1—1, the spacer designated as 2 is of insulating material whose heat expansion coefficient is higher than that of the metal (copper, brass, etc.) of the condenser plates. At 3 is shown the elastic washer, 4 designates the ordinary washer, 5 represents the metal nut, 6 the metal bolts, 7 is the connecting terminal for the movable plates, 8 represents the connecting leads for the current supply line to the plates, 9 designates the stator plates and 10 the rotor plates of the condenser. The springs 3 allow the plate distance to adjust itself exactly corresponding to the temperature of the spacers.

If one part of the spacers, for instance for rotor 10, consists of hard rubber, and the remaining part of metal, the heat produces a progressing displacement of the rotor plates from the symmetrical position with respect to the stator plates which acts in the sense of an increase in capacity. In this case the springs 3 for the stationary part are not necessary. On the other hand it is also possible to use hard rubber for the spacers of the stationary plates and metal for the movable plates. In this case the springs for the movable plates can be omitted. It can furthermore easily be seen that it is not absolutely necessary to make all of the spacers of hard rubber for the corresponding systems. It is sufficient to make one part of the spacers of hard rubber and the remaining part of metal.

Figure 2 shows a further embodiment by way of example in which 1 designates the bottom and cover plate of the condenser made of hard rubber, 2' designates spacers for the rotor and stator made of any suitable material, for instance brass, 3 designates a spring disk for regulating the movability of the rotor, and 3' designates a spring disk to enable expansion of the hard rubber-spacer. 4 designates a washer, 5 designates a brass nut, and 16 designates a turning knob on a rotor shaft 17. 18 designates the rotor plates, and 19 designates the stator plates which are supported by the stator bolts 20. 11 designates the distance disk of hard rubber or other material whose heat expansion coefficient is higher than that of parts 2. 12 designates the set screw for regulating and adjusting the position of the rotor and 13 designates the metal bushing provided with threads.

The position of the plates 18 with respect to the position of plates 19 can be adjusted or regulated as described by means of screw 12. If this screw is adjusted, for instance, in a manner such that for the initial temperature $T_0$, the plates are disposed exactly in the center between the plates 19, then owing to an increase in temperature and consequently an expansion of disk 11 the plates 18 will be displaced from their central position towards the lower plates 19 and the capacity of the condenser therefore increases. If, however, the screw 12 is adjusted in a manner so that at the initial temperature $T_0$ the plates 18 are not in the center but somewhat nearer to the upper plates 19, then owing to an increase in temperature whereby the plates 18 will again be displaced towards the central position, the capacity of the condenser decreases. If at the initial temperature the screw 12 is adjusted in a manner so that the plates 18 are not in the central position but nearer to the lower plates, then at increasing temperature the capacity of the condenser increases considerably.

The characteristic of a condenser can be adjusted or regulated as desired by providing the means as above described; in other words it is now possible to give a condenser a negative characteristic which formerly had a positive characteristic, or to give a condenser a positive characteristic which normally had a negative characteristic, or a constant temperature characteristic within certain limits.

For a heat expansion coefficient of part 11 that is higher than that of part 2, the desired effect is considerably greater than that in the reversed case.

If a condenser according to Figure 2 is used in a tube transmitter, for instance as a tuning means $C_1$ (Fig. 3), the obtained frequency varies in accordance with the temperature of the oscillating circuit. The frequency can be made dependent on, or independent of the temperature as desired, by suitable adjustment at a definite initial temperature by means of the adjustment screw 12 (Fig. 2), of the axial position of the rotor plates with respect to the stator plates.

Under certain circumstances it may be advisable to connect the above condenser in series or parallel with an ordinary condenser. In this manner it is possible to adjust, regulate, or entirely eliminate the influence of the temperature on the resulting capacity at will. What has been mentioned above with reference to variable condensers is also applicable in the same sense to condensers in which all of the plates are stationary.

What I claim is:

1. A tunable condenser comprising two sets of plates, metallic spacers separating the plates of one set, insulating spacers having a different coefficient of expansion from the first mentioned spacers, separating the plates of the second set, and means permitting normal expansion of said spacers of said second set.

2. A tunable condenser comprising two sets of plates, insulating spacers separating the plates of one set, metallic spacers having a different coefficient of expansion from said first-mentioned spacers, separating the plates of the second set, a spring element secured by a nut retaining one set of said spacers and a second spring element which is free to expand to permit normal expansion of said second set of spacers.

3. A variable condenser comprising two groups of plates, one of said groups being fixed, the other rotatable, a set of metallic spacers separating all the plates of one group, the other of said group of plates having a set of spacers some of said spacers in said set being composed of a different kind of material than the other spacers in said last-mentioned set, each kind of material having a different temperature coefficient of expansion, and means permitting normal expansion of the spacers of said other group.

4. A variable condenser comprising two groups of plates, one of said groups being fixed, the other rotatable, a set of metallic spacers separating all the plates of one group, the other of said group of plates having a set of spacers some of said spacers in said set being composed of insulating material and the other spacers in said last-mentioned set being composed of metal, and means for permitting normal expansion of the spacers of said other group.

5. A variable condenser comprising a set of stator plates, two frame plates between which said stator plates are mounted, a set of spacer blocks some of which are positioned between adjacent stator plates and some between the end stator plates and said frame plates, tie rods for joining together said frame plates, stator plates, and the set of spacer blocks, a set of rotor plates, a shaft on which said rotor plates are mounted, a set of spacer blocks on said shaft between adjacent rotor plates, at least one of said spacer blocks composed of a material having a higher coefficient of expansion than that of said rotor plates, the remaining spacer blocks of said set having the same temperature coefficient as that of said rotor plates, and means for permitting said last-mentioned set of spacer blocks to expand upon rise of temperature.

MENDEL OSNOS.